Jan. 28, 1964          H. O. BROWN          3,119,364
                      LIFE SAVING SLED
Filed Oct. 1, 1962                      2 Sheets-Sheet 2
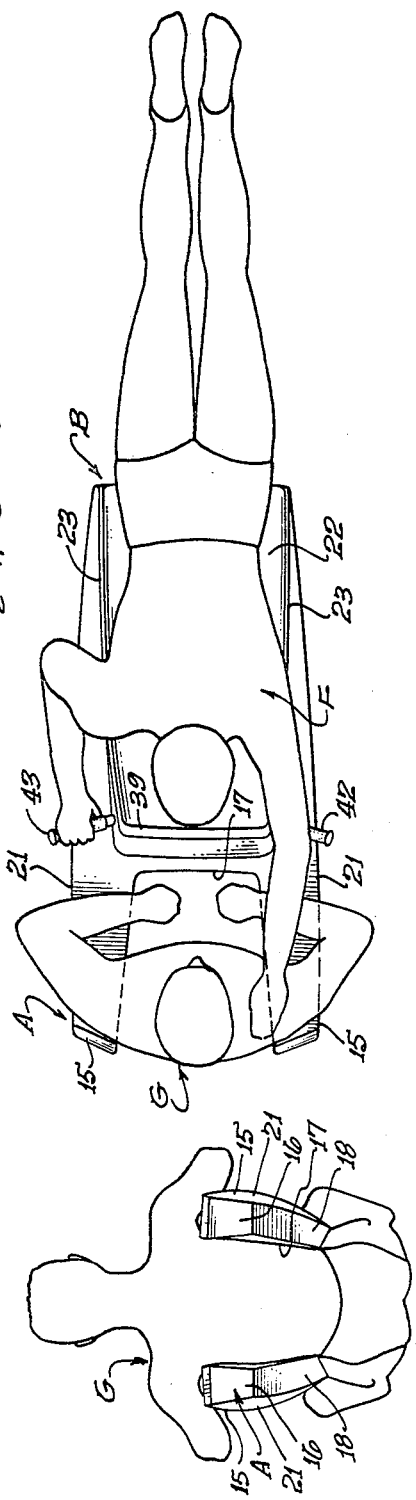
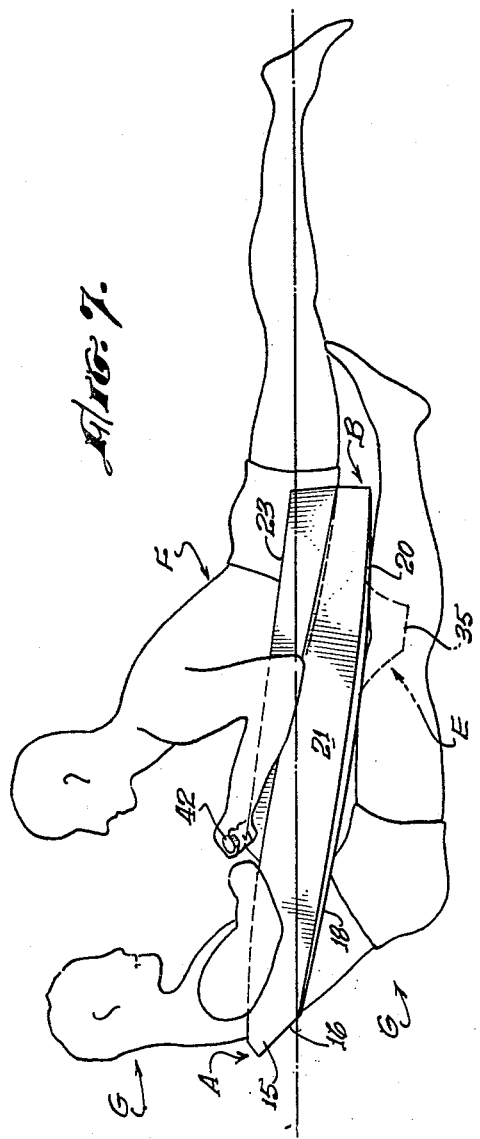
HUGH O. BROWN,
       INVENTOR.

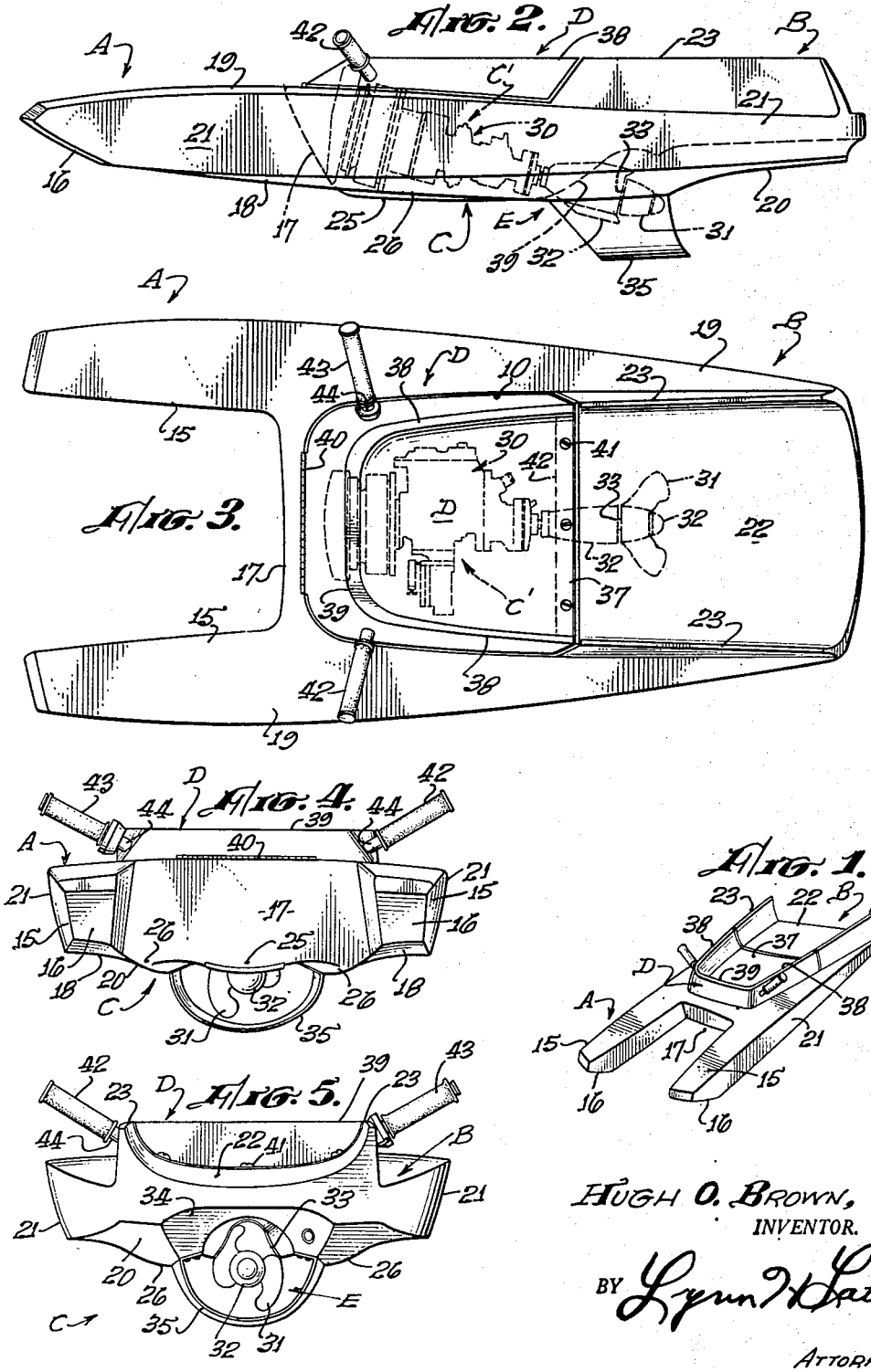

United States Patent Office 3,119,364
Patented Jan. 28, 1964

1

3,119,364
LIFE SAVING SLED
Hugh O. Brown, 6608 Vista Del Mar,
Playa del Rey, Calif.
Filed Oct. 1, 1962, Ser. No. 227,388
4 Claims. (Cl. 115—6.1)

This invention relates to an aquatic vehicle to be used by lifesavers to rescuing swimmers in distress, and has as its general object to provide a motor-propelled light weight buoyant vehicle which can be operated and readily maneuvered by a lifeguard and which has means especially adapted for supporting a victim of surf or other distress condition, with his head supported well above the surface of the water, while conveying him back to shore from a point of rescue.

In attaining the general object of lightness and maneuverability, the invention contemplates a water vehicle which is generally of sled form, adapted to support the upper portion of the lifesaver's torso in a position where he can control and operate the vehicle while maintaining close supervision over the victim being carried by the vehicle; the lifeguard's legs trailing in the water behind the vehicle and being used for steering and maneuvering the vehicle, thus, dispensing with steering equipment in the mechanism of the vehicle.

A further object is to provide such a vehicle having its forward portion especially adapted for supporting a victim in a manner such that it will be virtually impossible for him to slip back into the water while being conveyed to shore. More specifically, the invention aims to provide a forward victim-supporting section in the form of a forwardly projecting yoke having respective arms over which the arms of a victim are draped, the shoulders and head of the victim projecting upwardly or rearwardly over the central area of the vehicle, and the victim's legs trailing in the water beneath the vehicle in a manner such that the forward push of the base of the yoke portion against the victim's chest, countered by the rearward drag of the water against the victim's back and his trailing legs, will hold him securely in the crotch of the yoke, with his head and shoulders supported above the water level. Thus, even though the victim is unconscious, he will be securedly held with his head above the water and his body firmly engaged by the forwardly pushing vehicle. In further development of the broad object of lightness and maneuverability, the invention aims to provide a vehicle wherein only the upper portions of the bodies of the victim and lifeguard are supported above the water surface, approximately half of the weight of each body being buoyantly supported by immersion in the water. Thus, although adapted to support two persons, the vehicle need have only minimum size and corresponding buoyancy.

A further object is to provide a vehicle such as that outlined above, having a motor driven propeller projecting downwardly through the central area of its hull, and having means specially adapted for protecting the trail legs of the victim from being injured by the propeller.

Other objects and advantages will become apparent in the ensuing specification and appended drawing in which:

FIG. 1 is a perspective view of a lifesaver's sled embodying my invention;

2

FIG. 2 is a side elevation thereof;
FIG. 3 is a plan view thereof;
FIG. 4 is a front end elevational view thereof;
FIG. 5 is a rear end elevational view thereof;
FIG. 6 is a plan view showing the vehicle in use;
FIG. 7 is a side elevational view; and
FIG. 8 is a front end elevational view of the same.

Description

Referring now to the drawings in detail, I have shown therein, as an example of one form in which the invention may be embodied, a lifesaver's sled having a forward yoke portion A for supporting a victim; having a stern portion B adapted to the upper torso of a lifesaver; having a central hatch or engine pit C, housing a drive unit C'; having a hinged hatch cover D adapted to be lifted for access to the engine pit; and having a propeller and shroud assembly E in its rear bottom area.

The sections A, B and C are embodied in a unitary hull of hollow shell structure which may be fabricated of any suitable tough, wear-resistant, waterproof material such as impregnated fibre glass sheet material suitably fashioned so that the arms of the forward yoke section A and of the stern section B will be hollow and closed, both top and bottom and sides, leaving a hatch opening 10 which is normally closed by the hatch cover D and a rear central bottom opening through which the propeller of assembly E protrudes.

Yoke portion A comprises the laterally spaced tubular yoke arms 15 having closed forward ends including sled runner ramps 16 and a crotch portion 17 bridging transversely between the arms 15 at their bases and providing the forward wall of the engine pit section C. Rearwardly of the forward ramps 16, the arms 15 have bottom walls 18 which are slightly arched in transverse section so as to provide stabilizing wing surfaces on either side of the engine pit section C. The hull of the device has a marginal deck 19, substantially horizontal in transverse section, covering the yoke arms 15, bridging between them just forwardly of hatch cover D, and extending rearwardly along both sides of hatch cover D and the side margins of stern section B.

Stern section B of the vehicle comprises a hull having a transversely continuous bottom 20 and side walls 21 which extend forwardly with unbroken continuity to provide the side walls of engine pit section C and the outer side walls of the yoke arms 15. The side walls 21 converge rearwardly with conventional boat stern contours, for minimizing drag, are outwardly bellied in the mid areas of yoke arm 15, and converge forwardly in the forward areas of arms 15, likewise for the purpose of reducing drag.

The stern section B is provided with an integral deck 22 which is dished or cradle-shaped in transverse cross section as shown in FIG. 5, so as to cradle the mid torso of a lifeguard F resting on the deck 22 in prone position as shown in FIG. 7. On the respective sides of the deck 22 are integral copings 23, projecting upwardly so as to embrace the side of the lifeguard's chest, to enable him to brace his body between them, especially when executing directional maneuvering with his legs, and to provide a certain amount of protection against waves and spray.

Engine pit C is defined between the outer side walls 21 of the hull, and a bottom which includes a shallow, downwardly bellied keel portion 25 receiving the lower extremities of the engine, and a pair of downwardly projecting outrigger portions 26 extending substantially to the same depth as keel portion 25 at a point near the junction between stern section B and engine pit C, and which taper upwardly and forwardly to merge the lower, inward corners of yoke arms 15 along forwardly diverging lines, as indicated in FIG. 4. The outrigger portions 26 follow the rearward convergence of the inner margins of arms 15 as seen in FIG. 3, and cooperate to channel the water relatively flowing beneath the hull in a pair of upwardly arched flow channels which are defined between the outrigger portions 26 and the keel portion 25, whereby converging flows are directed to the propeller.

Drive unit C' embodies a conventional inboard marine engine 30 and a propeller 31 which is directly and rigidly coupled to the driven shaft thereof. The axis of the driven shaft is inclined downwardly and rearwardly as shown in FIG. 2, at an angle such that the propeller 31 projects rearwardly through the squared rear end of a bearing sleeve 32 which extends through the keel portion 25 of the hull bottom, is appropriately sealed therein, and constitutes the rear extremity thereof at 33. Rearwardly of the extremity 33, the hull bottom 20 is arched upwardly in its central portion, at 34, to accommodate the driving action of the propeller 31.

A shroud 35 of channel form has its respective side portions secured to the rear extremities of the outrigger portions 26 of the hull and is curved downwardly beneath and around the propeller 31, its fore-aft extent being equal to or greater than that of the propeller 31 so as to prevent any contact with the propeller from either side.

Hatch cover D comprises a central deck portion 37 having cross-sectional contour corresponding to that of the rear deck 22 so as to constitute a continuation thereof, and having the coping portion 38 of U-planform, with the sides thereof extending forwardly in aligned, continuation relation to the copings 23 of rear deck 22 and joined by a forward web portion 39. The latter slopes forwardly and downwardly to a forward margin which is connected by a piano hinge 40 to the forward transverse margin of the hatch opening 10. The rear marginal portion of hatch cover D is secured by screws 41 to a recessed transverse shoulder 42 along the forward margin of rear deck section 22, the screws 41 being removable so that the hatch cover can be lifted to uncover the engine.

Projecting from respective sides of the rail portion 38 of the hatch cover are a pair of engine controls, namely, a starter unit 42 (which may include a conventional cable extending to the fly wheel pulley of the engine) and a throttle unit 43, which may embody a rotatable handle and appropriate linkage generally similar to those employed in the throttle control of motorcycles. In each case, the connecting linkage of starter 42 and throttle 43 may extend through the bearing sleeves 44 in the respective sides of hatch rail 38. The control units 42 and 43 can be used not only for their primary control functions described above, but also as handles to which the life saver can cling to hold himself in operative position on the deck sections 22 and 37.

Operation

In using the lifesaving sled, a lifesaver F lies prone upon the deck areas 22 and 37 with his torso cradled between the copings 23 and 38, his fore arms resting upon the deck area 19 at respective sides of hatch D, and with his hands grasping the engine control handles 42 and 43.

The victim, indicated at G, after being reached by the lifesaver, is maneuvered into a position facing the yoke A, is hoisted out of the water sufficiently to bring his arms above the yoke arms 15, and is then slid forwardly into the yoke with his arms draped over the yoke arms 15 as indicated in FIGS. 6 and 7. The sled is then power-driven toward shore, the forward movement in the water and the counter drag of the water beneath the sled causing the victim's legs to trail in a more or less horizontal position as indicated in FIG. 7. Due to the rounded contour of the shroud 35 his legs will naturally assume a spread position disposed on opposite sides of the shroud, protected by the shroud against any contact with the propeller 31. The drag of the water against the immersed portion of the victim's body will tend to drag his upper torso rearwardly in the yoke A, thus positively maintaining him in position during the trip to shore.

The downwardly and rearwardly inclined position of the propeller axis is such that the operation of the propeller tends to elevate the stern of the sled from the water and to tilt the yoke portion A downwardly. In the event that the sled should escape from the life saver while the latter is preoccupied with the immediate problem of rescue of the victim and maneuvering him toward the sled, and if the engine should be operating (e.g., with a "stuck" throttle) at a speed such as to cause the sled to be power driven away from the scene, the upward tilt of the stern of the sled under such free travel conditions will tend to cause the yoke arms 15 to dip into the water and to thereby increase the upper tilt of the stern so long as forward travel continues at any substantial speed, and to thereby lift the propeller out of the water interrupting the drive and avoiding the escape of the sled from the rescue area. This is a final safety factor which can be relied upon in the event that the throttle does not automatically return to a closed position when the throttle control handle is released by the lifeguard's hand. Normally, if the sled should escape from his grasp, the motorcycle-type throttle control handle will automatically return to a throttle-closed position, thereby throttling down the engine sufficiently to enable the lifeguard to overtake the sled and bring it back under control. Furthermore, the invention contemplates the use of a centrifugal clutch (just behind the pump) connecting the engine shaft to the propeller, normally disengaged, and becoming engaged only when the engine is turning at a speed substantially above idling speed. Thus, when the throttle is closed and the engine is idling, the propeller will not be turning. This makes it possible to keep the engine running in an idling position, with the sled floating in a fixed position in water, without requiring the restarting of the engine when the victim has been placed aboard and the lifeguard is ready to start for shore.

The drawings (FIGS. 6–8) disclose a victim with his head upright and with his forearms inwardly over the yoke arms 15. This is intended to illustrate a tired swimmer who remains conscious while he is being towed to shore. In the case of an unconscious victim, the victim's arms normally will be extended downwardly into the water past the outer sides of the yoke arms 15 and his upper torso will be tilted more rearwardly with his head drooping toward or resting upon the forward portion of hatch cover D.

I claim:

1. In a lifesaving sled, in combination: a hull having a stern section provided with a low-level deck to support the upper torso of a lifeguard with his legs trailing in the water; a mid-section embodying an engine hatch; an engine in said hatch, having a propeller for driving the sled forwardly in the water; and a victim-supporting yoke projecting forwardly from said mid-section and embodying side arms spaced to extend beneath the arms of a victim so as to support his head above water while the lower portion of his body is buoyantly supported in the water.

2. A sled as defined in claim 1, including a tubular shroud encircling said propeller and protecting the victim's legs from contact therewith.

3. In a lifesaving sled, in combination: a hull having intermediate its ends an engine hatch, having a stern section provided with a low-level deck for supporting the upper torso of a lifesaver with his legs trailing behind the sled, having a forwardly projecting yoke section comprising respective arms spaced to extend beneath the arms of a victim so as to support his head above water with his legs trailing beneath the boat, and having lateral deck surfaces disposed outwardly of said hatch, on which the lifesaver may lean his forearms; drive means comprising an engine in said hatch and a propeller driven by said engine and extending downwardly and rearwardly through the bottom of said hull; and handles projecting laterally from said hatch over said lateral deck surfaces for engagement by the lifeguard's hands while operating the sled.

4. A sled as defined in claim 3, wherein said handles embody means for controlling said engine.

References Cited in the file of this patent

UNITED STATES PATENTS

| | | |
|---|---|---|
| 2,708,759 | Strawn | May 24, 1955 |
| 3,043,260 | Tank | July 10, 1962 |